(12) United States Patent
Uchida

(10) Patent No.: US 7,505,164 B2
(45) Date of Patent: Mar. 17, 2009

(54) PRINT CONTROL SYSTEM, INFORMATION PROCESSING APPARATUS, FUNCTION PROVIDING APPARATUS, PRINT FUNCTION DISPLAY METHOD, COMPUTER PROGRAM, AND COMPUTER-READABLE RECORDING MEDIUM

(75) Inventor: Tatsuro Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 11/369,998

(22) Filed: Mar. 8, 2006

(65) Prior Publication Data

US 2006/0146368 A1 Jul. 6, 2006

Related U.S. Application Data

(62) Division of application No. 10/828,194, filed on Apr. 21, 2004, now Pat. No. 7,052,192.

(30) Foreign Application Priority Data

Apr. 25, 2003 (JP) .............................. 2003-122610

(51) Int. Cl.
*G06F 15/00* (2006.01)
*G06F 3/12* (2006.01)
*G06K 1/00* (2006.01)

(52) U.S. Cl. .................................... 358/1.15; 358/1.13
(58) Field of Classification Search ................ 358/1.15, 358/1.1, 1.13, 1.14; 717/174
See application file for complete search history.

(56) References Cited

U.S. PATENT DOCUMENTS

| 4,916,699 | A | 4/1990 | Ohashi | 714/46 |
|---|---|---|---|---|
| 5,832,298 | A | 11/1998 | Sanchez et al. | 395/828 |
| 5,930,810 | A | 7/1999 | Farros et al. | 715/506 |
| 6,313,921 | B1 | 11/2001 | Kadowaki | 358/1.15 |
| 6,493,101 | B1 * | 12/2002 | Okazawa | 358/1.15 |
| 6,915,514 | B1 * | 7/2005 | Machida | 717/174 |
| 2002/0051191 | A1 | 5/2002 | Naito et al. | 358/1.15 |
| 2003/0061322 | A1 | 3/2003 | Igarashi et al. | 709/223 |
| 2003/0066027 | A1 | 4/2003 | Nakagiri | 715/500 |
| 2004/0212829 | A1 | 10/2004 | Uchida | 358/1.15 |

FOREIGN PATENT DOCUMENTS

| CN | 1329299 | 1/2002 |
|---|---|---|
| JP | 8-339274 | 12/1996 |
| JP | 9-026867 | 1/1997 |
| JP | 10-084443 | 3/1998 |
| JP | 2000353079 A * | 12/2000 |
| JP | 2002-111930 | 4/2002 |
| JP | 2004-038458 | 2/2004 |

* cited by examiner

*Primary Examiner*—Douglas Q Tran
(74) *Attorney, Agent, or Firm*—Fitzpatrick, Cella, Harper & Scinto

(57) ABSTRACT

The user can be properly notified in what kinds of statuses functions that are realized upon printing are. When statuses of functions which are realized by a print control system are displayed on a display unit, by changing the display in the display unit regarding the statuses of the functions on the basis of function information disclosed in a function list sent from a server computer and function information (internal function information) regarding (substances of) the functions already installed in a client computer, the display in the display unit is dynamically changed in accordance with the statuses of the functions, thereby enabling the user to easily recognize in what kinds of statuses the functions which he wants to use upon printing are.

9 Claims, 7 Drawing Sheets

PRINT CONTROL SYSTEM, INFORMATION PROCESSING APPARATUS, FUNCTION PROVIDING APPARATUS, PRINT FUNCTION DISPLAY METHOD, COMPUTER PROGRAM, AND COMPUTER-READABLE RECORDING MEDIUM

This application is a division of application Ser. No. 10/828,194, filed Apr. 21, 2004 now U.S. Pat. No. 7,052,192, the contents of which are incorporated herein by reference.

BACKGROUND OF THE INVENTION

1. Field of the Invention

The invention relates to a print control system, an information processing apparatus, a function providing apparatus, a print function display method, a computer program, and a computer-readable recording medium. More particularly, the invention is suitable to be used for executing printing by a printing apparatus on the basis of a function designated by the user.

2. Related Background Art

When printing of an image or the like is executed by a printer (printing apparatus), generally, the user designates a function and the printing is executed on the basis of the designated function.

In this case, hitherto, display statuses of control such as various buttons, list box, text field, and the like corresponding to functions in a user interface of a printer driver are differentiated according to whether the function is valid or invalid, thereby notifying the user whether the function is available or not.

Since the functions naturally relate to each other in dependence on a combination of the functions, or an attaching status or the like of an option to the printer as an output target, whether the functions is valid or invalid is discriminated in consideration of such a relation, and a discrimination result is displayed, thereby notifying the user whether the function can be used or not. For example, there is a method disclosed in Japanese Patent Application Laid-Open No. H09-026867.

However, when considering the case where a function of a server is added to a client, the function of the server is directly used by the client, or the display status of the function is dynamically changed, there are limitations in the foregoing conventional method.

That is, according to the conventional method, whether the function "can be used" or "cannot be used" in an environment of the client is merely displayed. With respect to the printer driver, it has become possible to download the latest printer driver from a Web by the Internet. Unlike a printing apparatus, the printer driver can be easily updated (version-up) after its shipping. A method whereby by downloading a plug-in module from the server into a printer driver which has already been installed in a computer in consideration of conditions such as charging or the like without downloading the whole printer driver from the Web, a new function is added to the existing printer driver has been considered by the same applicant as the present invention. Thus, according to the conventional method, such an intermediate status of the function that if the function of the server is downloaded to the client, it can be used, that the function of the server can be directly used by the client, or the like cannot be displayed.

Further, if the apparatus is in the status where the function provided for the server can be directly used by the client, in dependence on the status of the server, network, or the like, there are both cases where the function "can be used" and "cannot be used."

Specifically speaking, if the function has been provided by the server, it can be used, but if the function is not provided, it cannot be used. If the status of the network by which the server, the client, and the printer are connected is normal, the function provided by the server can be used. However, if it is abnormal, the function cannot be used. There is another case where the function provided by the server "can be used" or "cannot be used" in dependence on an operating situation or the like of the server.

When the apparatus is in the status where if the function provided for the server is downloaded to the client, it can be used, by having a procedure of downloading it from the server, such a function "can be used."

However, in such a case also, there are both cases where the function "can" be set to the status where it can be used soon and it "cannot" be set to such a status soon in dependence on the status of the server, network, or the like.

However, the conventional technique has such a problem that since the user cannot be properly notified of the status of the function provided for the server as mentioned above, it is difficult for him to specifically know a status in which the function that he desires is.

SUMMARY OF THE INVENTION

According to one aspect of the present invention, the invention is made in consideration of the foregoing problems and it is an object of the invention to enable the user to be notified of a status in which a function that is realized upon printing is.

According to the invention, there is provided an information processing apparatus having a printer driver for instructing a printing apparatus to execute printing so that functions designated by the user are realized, comprising: function list obtaining means for obtaining a list of the functions which can be provided by a function providing apparatus from the function providing apparatus which provides the functions designated by the user; and display control means for displaying statuses of the functions which can be provided by the function providing apparatus onto a print setting display screen of the printer driver on the basis of function information included in the list of the functions obtained by the function list obtaining means.

The function providing apparatus according to the invention provides the functions designated by the user when the printing apparatus is instructed to execute the printing to the information processing apparatus, wherein the list of the functions is provided to the information processing apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

First Embodiment

Figure 1:
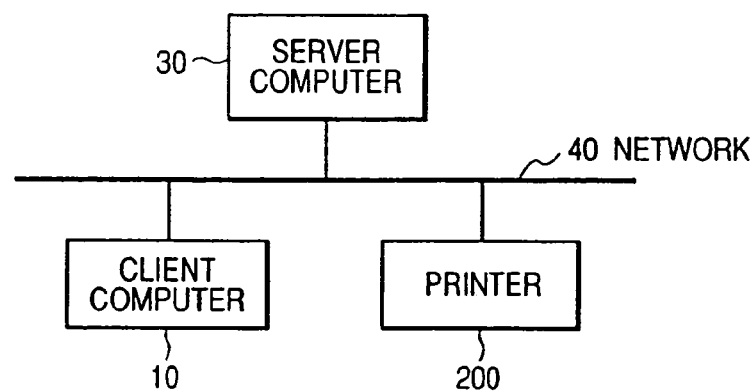
FIG. 1 shows an embodiment of the invention and is a block diagram showing an example of a minimum construction in a print control system.

The first embodiment which is preferred to the invention will be described hereinbelow with reference to the drawings. FIG. 1 is a block diagram showing an example of a minimum construction in a print control system of an embodiment. In the diagram, a client computer 10 (corresponding to an information processing apparatus of the invention), a printer 200, and a server computer 30 (corresponding to a function providing apparatus of the invention) are connected via a network 40.

As a network 40, an arbitrary network can be used so long as bidirectional communication between the client computer 10 and the server computer 30 can be made and communication from the client computer 10 to the printer 200 can be made.

For example, the network 40 is constructed by a network such as LAN (Local Area Network), WAN (Wide Area Network), Internet, or the like to which a plurality of information apparatuses are connected.

Although the client computer 10, the printer 200, and the server computer 30 are connected by the same network 40 in FIG. 1, they can be also connected via a plurality of networks so long as the foregoing communicating conditions are satisfied.

Although the printer 200 is connected to the network 40 in FIG. 1, it can be also connected to a local port or a local bus of the client computer 10. The printer 200 can be also connected to a local port or a local bus of another computer existing on the network 40.

Further, although only one client computer 10, one printer 200, and one server computer 30 are shown in FIG. 1, a plurality of client computers, printers, and server computers can also exist.

Figure 2:
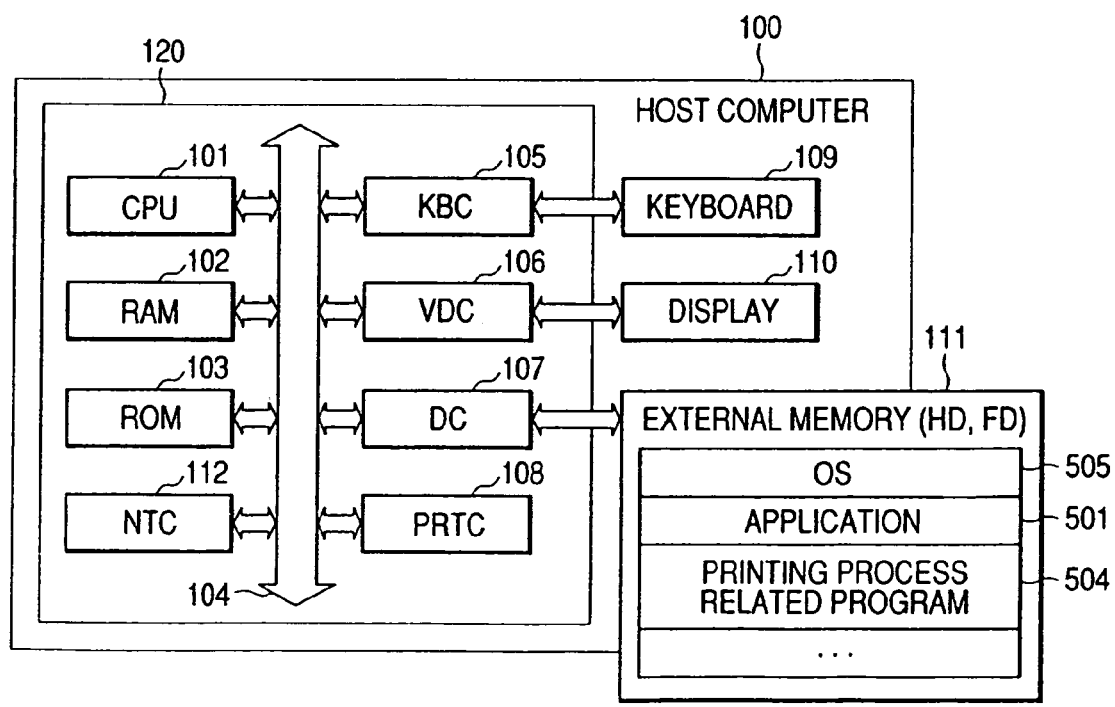
FIG. 2 shows the embodiment of the invention and is a block diagram showing an outline of a construction of an information apparatus host computer which is used for a client computer and a server computer.

FIG. 2 is a block diagram showing an outline of a construction of an information apparatus host computer 100 which is used for the client computer 10 and the server computer 30.

In the diagram, the host computer 100 comprises: a CPU 101; a RAM 102; a ROM 103; a keyboard controller (KBC) 105; a video controller (VDC) 106; a disk controller (DC) 107; a printer controller (PRTC) 108; a network controller (NTC) 112; a keyboard 109; a display 110; and an external memory 111.

A construction of each unit of the host computer 100 will be described in detail. The CPU 101 is a central processing unit for integratedly controlling the devices connected to a system bus 104. The CPU 101 executes processes of a document in which a figure, an image, characters, a table (including a spreadsheet or the like), and the like exist mixedly on the basis of a document processing program or the like stored in a program area in the ROM 103 or the external memory 111.

The CPU 101 executes, for example, a developing (rasterizing) process of an outline font to a display information RAM set on the RAM 102, thereby enabling WYSIWYG (What You See Is What You Get: a function by which an image seen on a display screen of a CRT display can be printed in the same size and shape) on the display 110.

Further, the CPU 101 opens various registered windows on the basis of commands instructed by a mouse cursor (not shown) on the display 110 and executes various data processes.

For example, when the user executes the printing by using the printer 200, he opens the window regarding the print setting and can execute setting of the printer 200 and setting of a print processing method including selection of a print mode to the printer driver.

The RAM 102 functions as a main memory, a work area, or the like of the CPU 101.

The ROM 103 is divided into a font area, a program area, and a data area.

The font area or the external memory 111 stores font data or the like which is used in the document process. The program area or the external memory 111 (the access to them is controlled by the disk controller (DC) 107) is a hard disk (HD), a floppy (registered trademark) disk (FD), or the like. As shown in the diagram, they store not only an operating system program (hereinafter, referred to as "OS") 505, various applications (for example, a document processing application program for executing the process of a document in which a figure, an image, characters, a table, and the like exist mixedly) 501, and a printing process related program 504, but also a user file, an edit file, and the like.

The printing process related program 504 is a program to form print data and can be used in common to a plurality of printers of the same series. The data area or the external memory 111 stores various data which is used when the document process or the like is executed.

The keyboard controller (KBC) 105 controls a key input from the keyboard 109 or a pointing device (not shown).

The video controller (VDC) 106 controls a display of the display 110.

The disk controller (DC) 107 controls an access to the external memory 111.

A printer controller (PRTC) 108 is connected to the printer 200 via a bidirectional interface and executes a process for controlling communication with the printer 200. The keyboard 109 has various keys. The display 110 displays a figure, an image, characters, a table, and the like.

The external memory 111 is constructed by a hard disk (HD), a floppy (registered trademark) disk (FD), or the like. The external memory 111 is used as an area to store a boot program, the OS 505, the various applications 501, the font data, the user file, the edit file, the printer control command forming program (hereinbelow, referred to as a printer driver) 504, and the like.

A network controller (NTC) 112 controls transmission and reception of data to/from another information apparatus connected via the network 40 on the basis of a predetermined protocol.

As mentioned above, it is desirable to connect the printer 200 to the network 40. It is also preferable to connect the client computer 10 and the server computer 30 via the network 40.

The foregoing CPU 101, RAM 102, ROM 103, keyboard controller (KBC) 105, video controller (VDC) 106, disk controller (DC) 107, printer controller (PRTC) 108, and network controller (NTC) 112 are arranged on a computer control unit 120.

Figure 3:
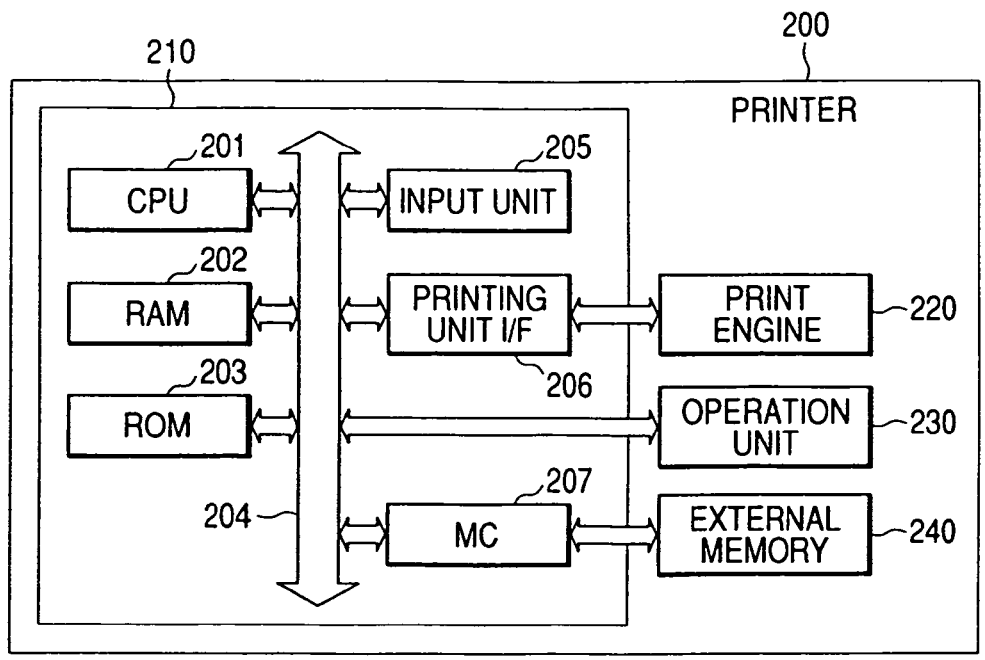
FIG. 3 shows the embodiment of the invention and is a block diagram showing an outline of a construction of a printer.

FIG. 3 is a block diagram showing an outline of a construction of the printer 200. In the diagram, the printer 200 comprises: a CPU 201; a RAM 202; a ROM 203; an input unit 205; a printing unit interface (I/F) 206; a memory controller (MC) 207; a printer engine (print engine) 220; an operation unit 230; and an external memory 240.

A construction of each unit of the printer 200 will now be described in detail. The CPU 201 is a central processing unit for integratedly controlling devices connected to a system bus 204. The CPU 201 outputs an image signal as output information to the print engine 220 on the basis of a control program or the like stored in a program area in the ROM 203 or a control program or the like stored in the external memory 240.

The CPU 201 can execute a process of communication with the host computer 100 via the input unit 205 and notify the host computer 100 of information or the like in the printer 200.

The RAM 202 functions as a main memory, a work area, or the like of the CPU 201 and a memory capacity can be expanded by an option RAM (not shown) connected to an expansion port. The RAM 202 is used as an output information developing area, an environment data memory area, an NVRAM (Non-volatile Random Access Memory), or the like.

The ROM 203 is divided into a font area, a program area, and a data area. The font area stores font data and the like which are used when the output information is formed. The program area stores the control program and the like of the CPU 201. When the external memory 240 such as a hard disk or the like is not connected to the printer 200, the data area stores information and the like which are used on the host computer 100.

The input unit 205 executes transmission and reception of data between the printer 200 and the host computer 100 via the bidirectional interface. The printing unit interface (I/F) 206 executes transmission and reception of data between the CPU 201 and the printer engine (print engine) 220.

The memory controller (MC) 207 controls an access to the external memory 240. The printer engine (print engine) 220 executes the printing operation on the basis of the control by the CPU 201. Specifically speaking, the printer engine 220 is constructed by a conveying mechanism of a recording medium (not shown), a semiconductor laser unit, a photosensitive drum, a developing unit, a fixing unit, a drum cleaning unit, a separating unit, and the like and executes printing by a well-known electrophotographic process.

The operation unit 230 has switches for various operations, display means (for example, an LED display), and the like.

The external memory 240 is constructed by a hard disk (HD), an IC card, or the like and connected as an option to the printer 200.

The external memory 240 stores font data, an emulation program, form data, and the like and an access to it is controlled by the memory controller (MC) 207.

The number of external memories 240 is not limited to one but a plurality of memories can be provided. That is, in addition to built-in fonts, a plurality of option cards and a plurality of external memories in each of which a program to interpret printer control languages of different language systems has been stored can be connected to the printer 200. Further, an NVRAM (not shown) can be built in the apparatus and printer mode setting information from the operation unit 230 can be also stored in the NVRAM.

The CPU 201, RAM 202, ROM 203, input unit 205, printing unit interface (I/F) 206, and memory controller (MC) 207 are arranged on a printer control unit 210.

Figure 4:
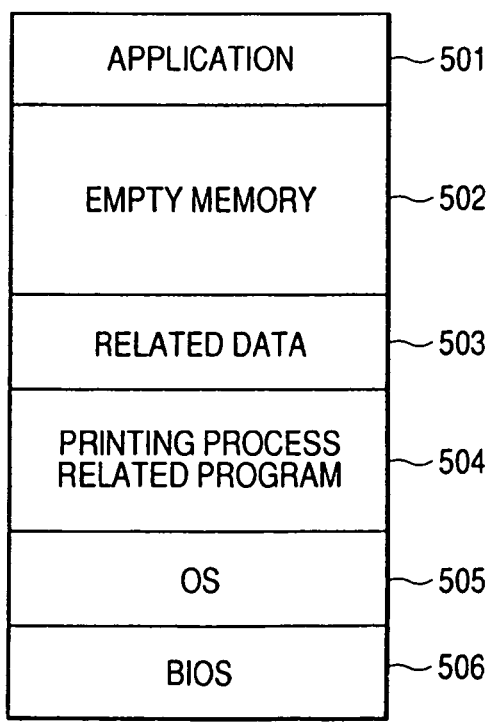
FIG. 4 shows the embodiment of the invention and is a diagram showing an example of a memory map in a RAM loaded into the host computer by activating a printing process related program.

FIG. 4 shows a memory map in the RAM 102 in the state where the predetermined application 501 and the printing process related program 504 in which the printer 200 is used as a control target have been activated and loaded into the RAM 102 on the host computer 100.

As shown in the diagram, in addition to a BIOS (Basic Input Output System) 506 and the OS 505, the application 501, the printing process related program 504, and related data 503 have been loaded in the RAM 102. Further, an empty memory area 502 has also been assured in the RAM 102. Thus, the application 501 and the printing process related program 504 enter an executable state. The printing process related program 504 allows a print setting display screen to be displayed on the display (for example, CRT) 110 in response to a print setting instruction by the user and enables the setting to be made by the user.

Figure 5:
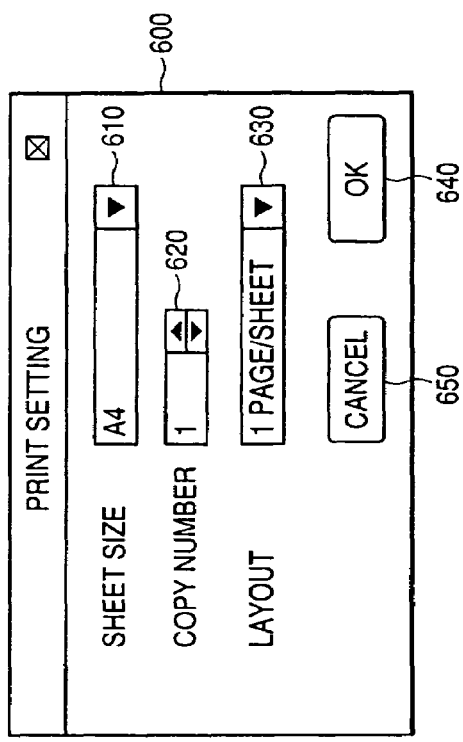
FIG. 5 shows the embodiment of the invention and is a diagram showing a display example of a print setting display screen.

FIG. 5 shows a display example of the print setting display screen 600 as a user interface (UI) of the printer driver (program) of the invention. In the diagram, a column (pull-down list box) 610 of "sheet size" is used for deciding a size of sheet to be printed. The user can select the size of print sheet by the pull-down list box 610.

A column (copy number spin control box) 620 of "copy number" is used for deciding the number of copies to be printed. The user can input the desired number of print copies by the copy number spin control box 620.

A column (pull-down list box) 630 of "layout" is used for deciding a print style. "1 page/sheet" displayed in the pull-down list box 630 denotes that one print page is printed as it is onto one sheet.

By selecting the pull-down list box 630, "2 pages/sheet" (two pages are reduced and arranged onto one sheet so as not to overlap) and the like other than the above example are displayed. The user can select a desired print layout as mentioned above.

If the user permits the contents set by using the pull-down list box 610, the copy number spin control box 620, and the pull-down list box 630 as described above, he clicks an OK button 640. On the contrary, to cancel the set contents, the user clicks a cancel button 650.

In the specification, items which can be set by the user as mentioned above are referred to as "printer functions" or as "functions." Although the apparatus actually has many other printer functions, they are omitted for simplicity of explanation.

Figure 6:
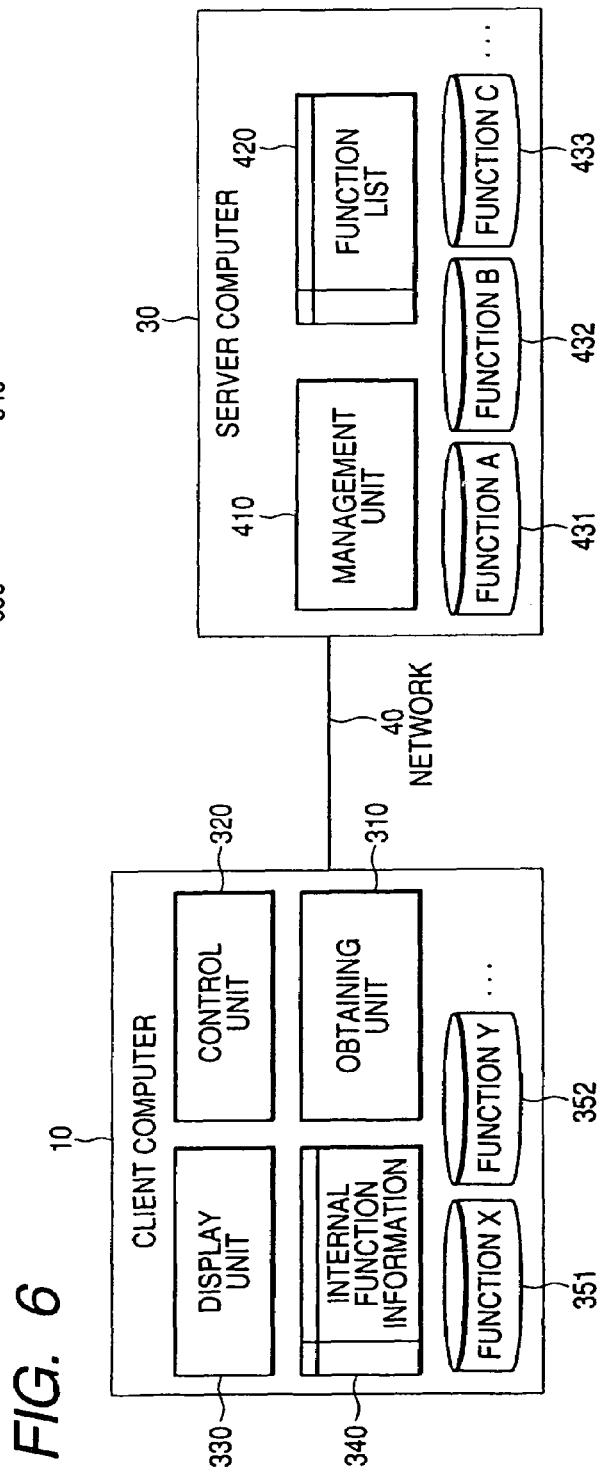
FIG. 6 shows the embodiment of the invention and is a block diagram showing an example of a specific construction in the print control system.

FIG. 6 is a block diagram showing an example of a specific construction in the print control system of the embodiment. The client computer 10 comprises: an obtaining unit 310 for receiving various information and a function module to realize the printer function from the server computer 30; a control unit 320 for outputting an instruction to the obtaining unit 310 and deciding a display status to each printer function of the print setting display screen from internal function information, which will be explained hereinafter, the information received by the obtaining unit 310, and the like; a display unit 330 for actually displaying the print setting display screen; an internal function information list 340 for storing the internal function information in which information (printer function information) regarding printer functions 351 and 352 existing in the client computer 10 has been disclosed; a printer function storing unit for storing the specific printer functions (function X, function Y) 351 and 352; and the like. Although the case where there are the two specific printer functions 351 and 352 has been shown as an example in FIG. 6, the number of specific printer functions is not limited to 2.

The server computer 30 communicates with the client computer 10 and provides printer functions 431 to 433 and a function list 420, which will be explained hereinafter, to the client computer 10. Specifically speaking, the server computer 30 comprises: a management unit 410 for managing the printer functions 431 to 433 and the function list 420; the function list 420 in which information (printer function information) regarding the printer functions 431 to 433 arranged in the server computer 30 has been disclosed; a printer function storing unit for storing the specific printer functions (function A, function B, function C) 431 to 433; and the like. Although the case where there are the three specific printer functions 431 to 433 is shown in FIG. 6, the number of specific printer functions is not limited to 3.

In the construction as mentioned above, the operation which is executed in the case where the statuses of the functions existing in the server computer 30 are displayed on the print setting display screen of the client computer 10 will be described.

First, the function list 420 will be explained. For example, an identification name of the relevant function, an ID (identification) of the relevant function, revision, type information showing the type in which a new function is downloaded into the client computer 10 and used or the type in which a new function can be executed on the client computer 10, a related file, and printer function information of the corresponding printer or the like have been disclosed on the function list 420.

The management unit 410 will now be described. It is assumed here that the management unit 410 of the server computer 30 is always operating. The management unit 410 processes mainly three requests "request for function list," "request for obtainment of function," and "request for use of function."

Figure 7:
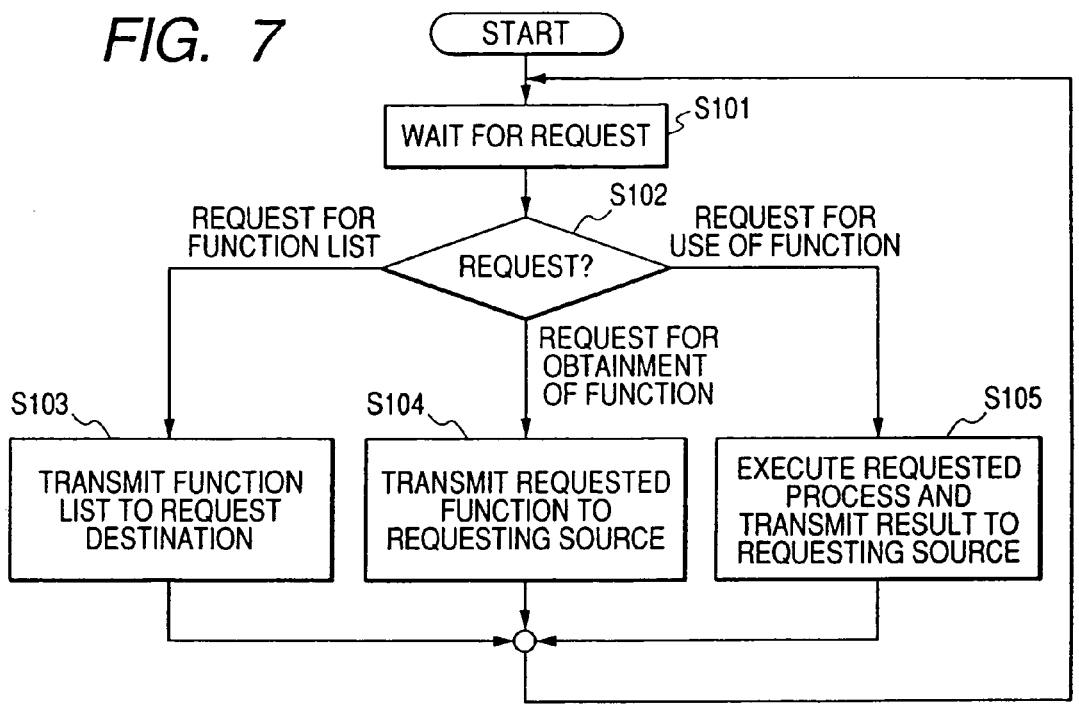
FIG. 7 shows the embodiment of the invention and is a flowchart showing processes of a management unit.

FIG. 7 is a flowchart in the case where those three requests are processed by the management unit 410.

Although it is assumed that the management unit 410 is always activated as mentioned above, it is properly initialized just after the first request was processed and enters the status in which the apparatus waits for the request from the client computer 10 (step S101).

When the request from the client computer 10 (to the server computer 30) is detected, the processing routine is branched every type of request (step S102).

When the type of request indicates the "request for function list," necessary information such as name and address of the client computer 10 on the requesting source side, printer model information (information showing for what kind of printer model the function is requested), and the like is collected and, after that, the function list 420 which is managed by the server computer 30 is returned to the requesting source (step S103).

In step S103, it is possible that not all information on the function list 420 is returned but only the minimum amount of information that is needed by the client computer 10 is picked up and returned.

For example, if the printer model information which is transmitted to the requesting source is not disclosed in the items of the corresponding printer disclosed on the function list 420, the information of the function list 420 from which the items regarding the relevant function on the function list 420 have been deleted can be returned to the requesting source.

If the type of request is the "request for obtainment of function, " in addition to the name and address of the client computer 10 of the requesting source side, the IDs of the requested functions 431 to 433, the printer model information, and the like are transmitted from the client computer 10.

After those information is collected, only in the case where the requested printer functions 431 to 433 are the type in which they are downloaded into the client computer 10, the management unit 410 returns copies of the file group (function related file group) associated with the printer functions 431 to 433 to the client computer 10 of the requesting source side (step S104).

At this time, in the case where the requested printer functions 431 to 433 are not the type in which they are downloaded to the client computer 10, in the case where there is a mismatch in the requests, or the like, a message showing that the requested printer functions 431 to 433 cannot be provided is returned to the requesting source.

If the printer function information for the non-corresponding printer model is not provided in step S103, the client computer 10 does not request the printer function which mismatches the corresponding printer model.

If the type of request is the "request for use of function," in addition to the name and address of the client computer 10 of the requesting source side, the IDs of the requested printer functions 431 to 433, the printer model information, various set values which are necessary for the processes, and processing target objects are transmitted from the client computer 10.

After the management unit 410 collected those information, it verifies whether there is not a mismatch in the requests or not. For example, if the types of the requested printer functions 431 to 433 are not the type in which the function is executed in the server computer 30, or if various set values for executing the processes or the substance of the object of the processing target is illegal or the like, the management unit 410 determines that the processes cannot be executed and returns a notification of such a fact to the client computer 10.

If it is determined that the processes can be executed, the management unit 410 executes the requested (designated) functions 431 to 433 and returns a result of the processes to the client computer 10 of the requesting source side (step S105). After the processes according to the request from the client computer 10 are executed as mentioned above, the apparatus is returned to the status of waiting for the request (step S101).

It is desirable that the management unit 410 also responds to the requests such as "request for addition of function, " "request for deletion of function, " "request for finishing, " and the like. Those requests are issued by the application exclusively for managing the functions of the client computer 10. On the basis of those requests, the management unit 410 executes the addition or deletion of the printer functions arranged in the server computer 30 and, further, the finishing of the management unit 410.

The operation in the client computer 10 will now be described. In the client computer 10, the obtaining unit 310 communicates with the server computer 30 which provides the printer functions 431 to 433 and the function list 420.

The obtaining unit 310 operates in accordance with an instruction from the control unit 320 and mainly processes the three requests such as "obtainment of function list," "obtainment of function," and "obtainment of execution result of function" in correspondence to the management unit 410 of the server computer 30.

It is also possible to construct in such a manner that the obtaining unit 310 is activated each time a request is made by the control unit 320 or the request from the control unit 320 is processed by the obtaining unit 310 keeping its state activated. Explanation will be made here limiting to the former case where the obtaining unit 310 is activated corresponding to the necessity by the control unit 320.

Figure 8:
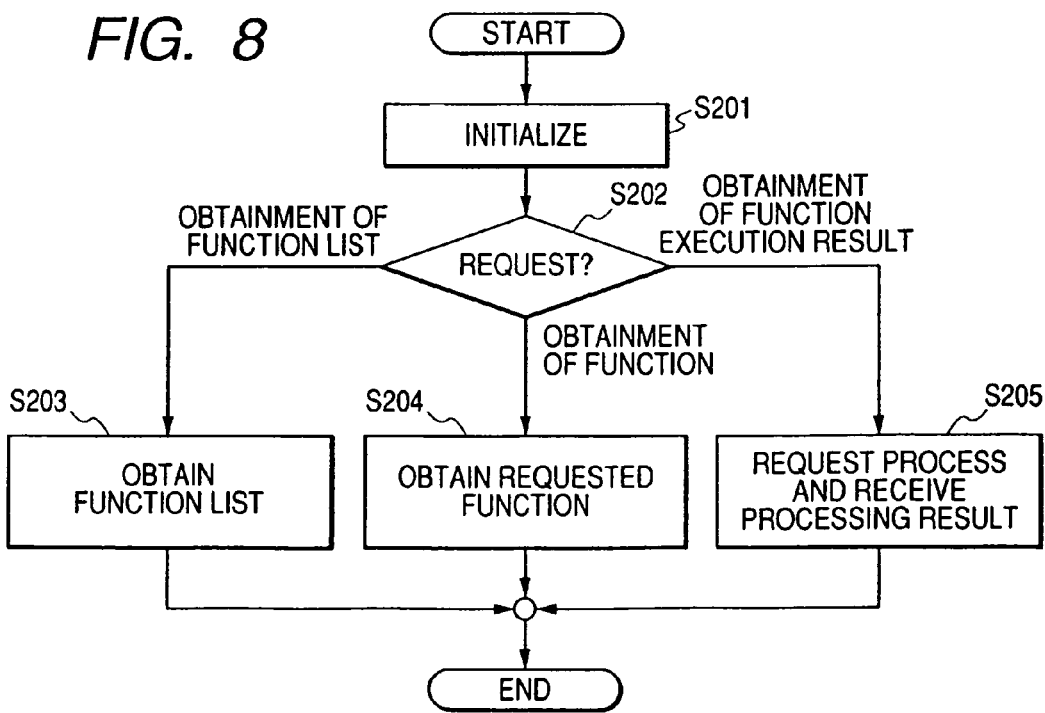
FIG. 8 shows the embodiment of the invention and is a flowchart showing processes of an obtaining unit.

FIG. 8 is a flowchart showing processes of the obtaining unit 310. When the obtaining unit 310 is activated, it is properly initialized. Upon initialization, the name or address of the server computer 30 as an inquiry target is collected and information of the printer model to be inquired, or the like is also collected (step S201).

After that, the processes are branched in accordance with the request (step S202). If the request is the "obtainment of function list," the "request for function list" is issued to the server computer 30. At this time, the "request for function list" is issued together with the name and address of the client computer 10 on the requesting source side, the requested printer model name, and other necessary information.

The server computer 30 executes the process in step S103 in FIG. 7 and transmits the function list 420 (also called "addition possible function information") to the client computer 10 in response to such a request.

The obtaining unit 310 obtains the function list 420 returned from the server computer 30 and transfers the obtained function list 420 to the control unit 320 (step S203).

If the request is the "obtainment of function," the "request for obtainment of function" is issued to the server computer 30 together with the name and address of the client computer 10 of the requesting source side, the requested printer model name, the IDs of the requested printer functions 431 to 433, and the like.

The server computer 30 executes the process in step S104 in FIG. 7 and receives a requested function related file group (plug-in modules). After the function related file group was stored into a memory area in the client computer 10, by writing once the printer function information in the function related file group into the internal function information list 340, a new DLL file and link information are added and a new function is added to the printer driver. The obtaining unit 310 returns a discrimination result about whether those processes have correctly been executed or not to the control unit 320 as a calling source (step S204).

If the request is the "obtainment of execution result of function," the "request for use of function" is issued to the server computer 30 together with the name and address of the client computer 10 on the requesting source side, the requested printer model name, the IDs of the requested printer functions 431 to 433, the various set values necessary for the processes, the object of the processing target, and the like.

Although there is a case where the various set values necessary for the processes, the object of the processing target, and the like differ every requested printer functions 431 to 433, all of them can be transferred via the control unit 320 or the obtaining unit 310 can also form and obtain them by itself.

The server computer 30 executes the process in step S105 in FIG. 7 and the client computer 10 receives a processing result. The processing result is returned to the printer driver which requested use of the function via the control unit 320 or to the UI control unit of the printer driver (step S205).

The control unit 320 will now be described. In the case of the print control system of the embodiment, the control unit 320 operates first in the client computer 10.

The control unit 320 can be activated by clicking a button arranged on the print setting display screen or can be also activated at timing when the print setting display screen itself is activated.

The client computer 10 holds a list of the server computers 30 which provide the printer functions 431 to 433 and the function list 420. The printer functions 431 to 433 and the function list 420 (printer function information) can be obtained from all of the server computers 30 held as a list or the printer functions 431 to 433 and the function list 420 (printer function information) can be also obtained from the server computer 30 designated separately by the user. In the embodiment, only the case of obtaining the function list 420 and the functions 431 to 433 from one server computer 30 will be explained as an example. Since there are a variety of operations of the control unit 320, three cases such as "updating of function status," "addition of function," and "use of server function" will be explained here.

Figure 9:
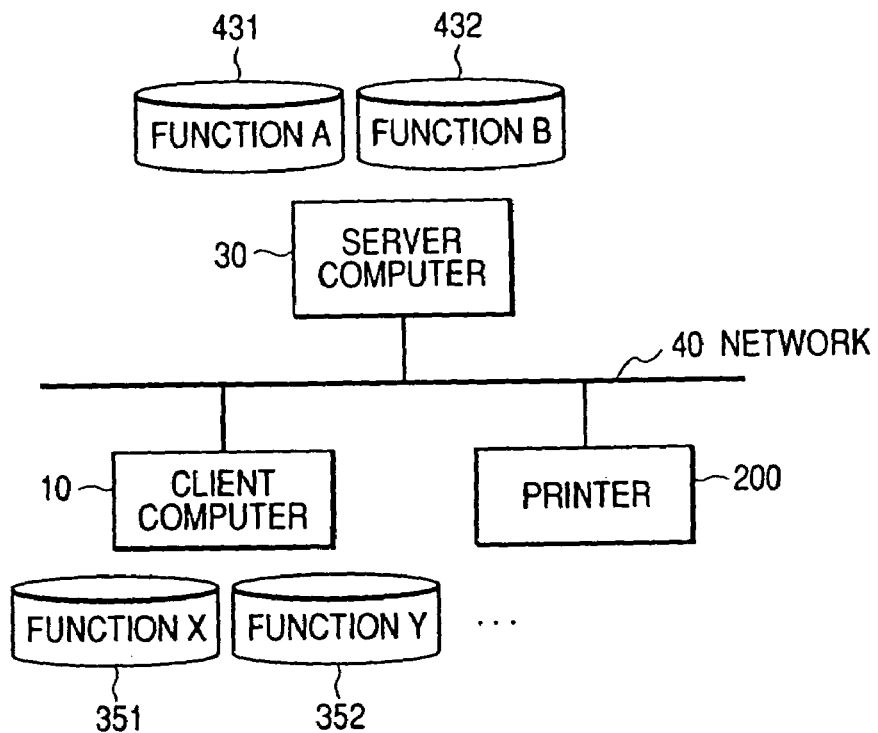
FIG. 9 shows the embodiment of the invention and is a diagram showing an example of a layout of functions in the print control system.

The three cases in the case where the functions in the print control system are arranged as shown in an example of FIG. 9 will be explained here. That is, in FIG. 9, the first printer function (function X) 351 and the second printer function (function Y) 352 have already been installed in the printer driver in the client computer 10 for the printer 200 and are in the valid status, respectively.

The third printer function (function A) 431 and the fourth printer function (function B) 432 corresponding to the printer 200 are arranged in the server computer 30. It is assumed that the third printer function (function A) 431 is the type in which it is downloaded into the client computer 10 and used and the fourth printer function (function B) 432 is the type in which the client computer 10 can use it directly in the state where it is held on the server computer 30.

(With Respect to the "Updating of Function Status")

Figure 10:
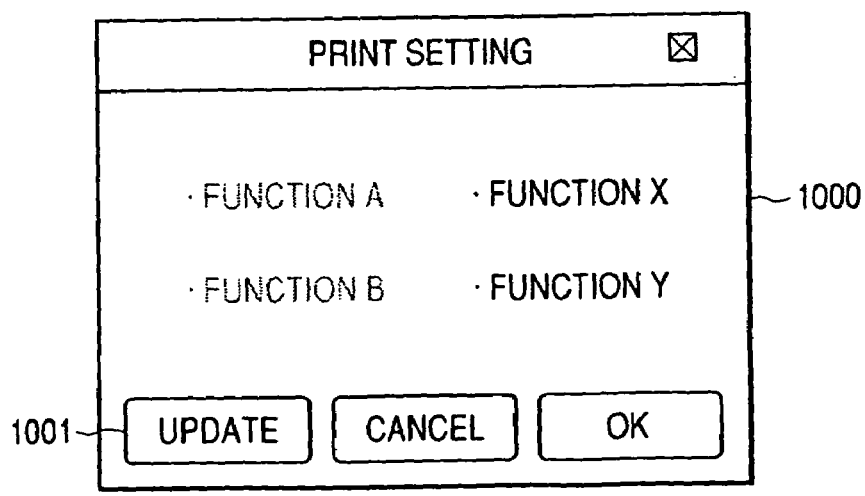
FIG. 10 shows the embodiment of the invention and is a diagram showing a display example of the print setting display screen before an "updating of function status" process is executed.

FIG. 10 is a diagram showing a display example of the print setting display screen before the "updating of function status" process is executed in the print control system in the embodiment. Both of the third printer function (function A) 431 and the fourth printer function (function B) 432 are displayed in a gray-out state on a print setting display screen 1000 in the diagram, thereby showing that they cannot be used at present.

Both of the first printer function (function X) 351 and the second printer function (function Y) 352 are displayed in a normal state, thereby showing that they can be used at present. The "updating of function status" process of the control unit 320 is started by clicking an update button 1001 on the print setting display screen 1000 displayed as mentioned above.

When none of the addresses and names of the server computers 30 is disclosed in the list of the server computers 30, since the "updating of function status" process cannot be executed, the update button 1001 is gray-out displayed. Those initial display states shown in FIG. 10 are displayed on the basis of the internal function information in the internal function information list 340.

Figure 11:
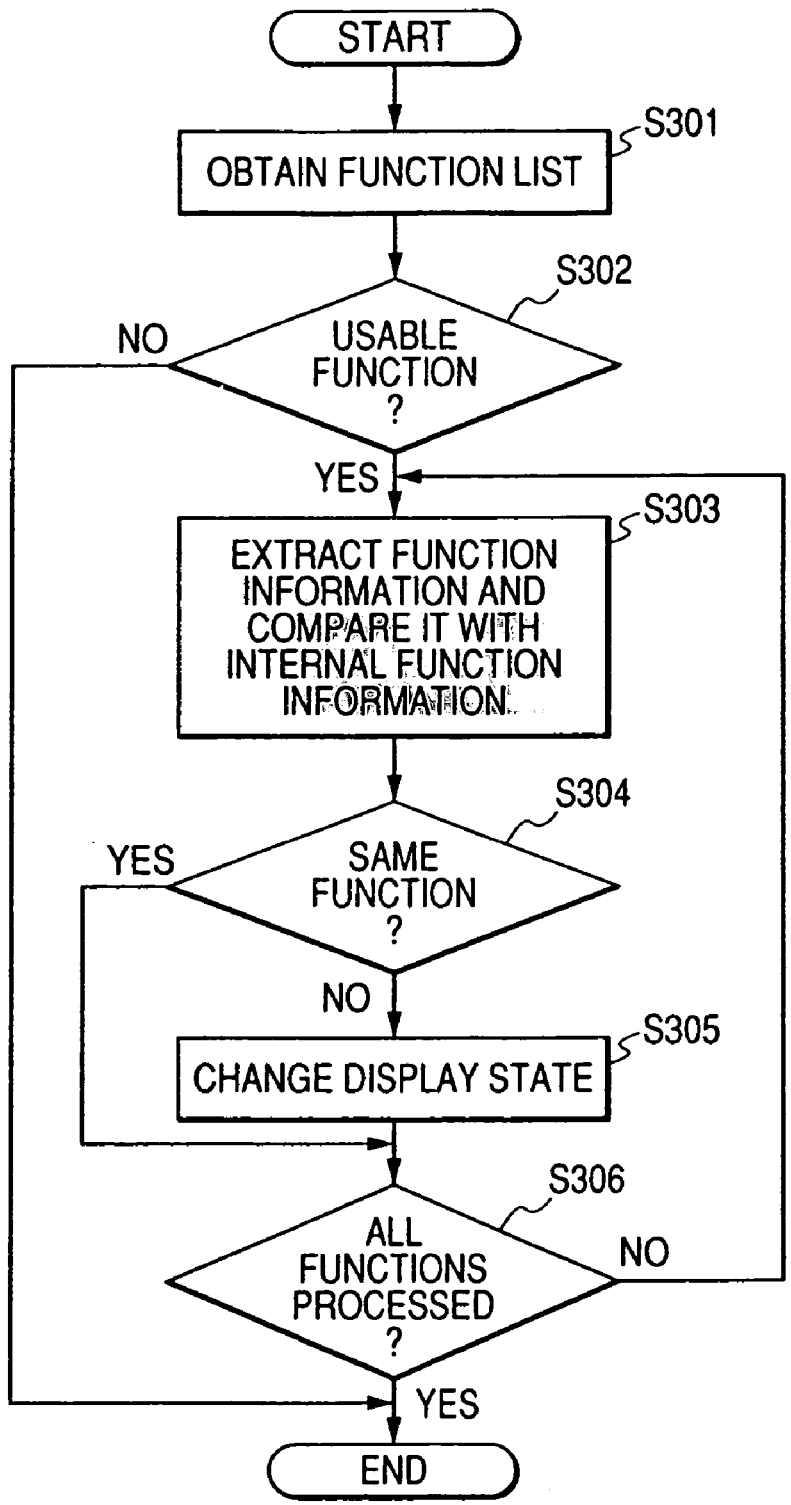
FIG. 11 shows the embodiment of the invention and is a flowchart showing specific contents of the "updating of function status" process.

FIG. 11 is a flowchart showing specific contents of the "updating of function status" process which is executed in the control unit 320. The updating process of the function status is started by issuing the "obtainment of function list" request to the obtaining unit 310 in the server computers 30 after the initialization. Thus, the function list 420 for the printer 200 which meets the request is obtained from the server computers 30 side (step S301).

If the function list 420 cannot be obtained in the process in step S301 and the printer function which can be used does not exist (No in step S302), this means that no printer function exists on the server computers 30 side or there is a problem somewhere on a communication path such as a network 40 or the like. Since the updating process of the function status cannot be executed in any case, a message showing such a fact is displayed and the processing routine is finished.

If the function list 420 can be obtained by the process in step S301 and there are the printer functions which can be used (Yes in step S302), the printer function information is picked up one by one in order from the obtained function list 420 and the internal function information in the internal function information list 340 is compared with the picked-up printer function information (step S303).

If the printer function information picked up from the function list 420 has already been disclosed in the internal function information list 340 (Yes in step S304), since the updating process of the display state is unnecessary, the next step (step S305) is omitted and step S306 follows.

If the printer function information picked up from the function list 420 is information which does not exist in the internal function information list 340 (No in step S304), an instruction to change the display state of the relevant function is issued to the display unit 330 (step S305).

If the printer function information to be processed still remains (No in step S306), the processing routine is returned to step S303 and the process is executed to the next picked-up printer function information. If the processes of all printer function information on the function list 420 are completed (Yes in step S306), the "updating of function status" process is finished.

The type of display state of the function will now be described. As also mentioned above, three statuses exist as statuses which can be used by the user in the embodiment.

Specifically explaining, the following statuses exist: a status "valid" in which the function has already existed in the client computer 10 and can be used; a status "download valid" in which the function exists in the server computer 30 and by downloading the function into the client computer 10, it can be used; and a status "network valid" in which the function exists in the server computer 30 and the function can be directly used by the client computer 10.

As another status, a status "unknown" in which since the function itself does not exist in the client computer 10, the use format cannot be grasped exists as a status in which the function cannot be used. The reason why the status "unknown" is set is because it may be possible to use the function via the network 40. An initial display state of "unknown" can be also gray-out displayed. It is desirable to gray-out display not only the "unknown" function but also a function which cannot be used due to a construction of the printer. That is, a user interface module of the printer driver controls the display screen so as to gray-out display the printers in which a duplex unit is not mounted so that a duplex printing function cannot be selected.

As a category other than those categories, there is also a case where the functions cannot be used because the printer driver or the printer 200 becomes a factor as a result of a combination of a function and another function (a plurality of different functions). However, such a case is not explained in particular here. Those four statuses "valid, " "download valid, " "network valid, " and "unknown" are displayed on the print setting display screen so that they can be easily understood.

Figure 12A:
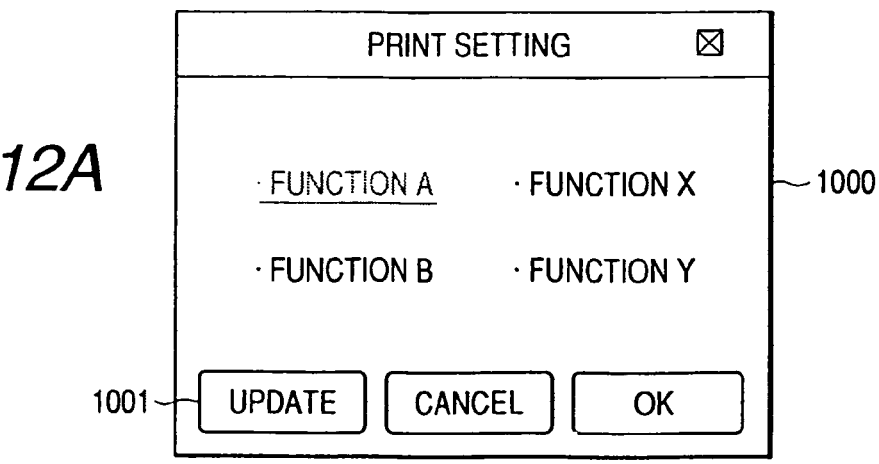
FIGS. 12A, 12B, and 12C show the embodiment of the invention and are diagrams showing display examples of the print setting display screen after the "updating of function status" process was executed.
Figure 12B:
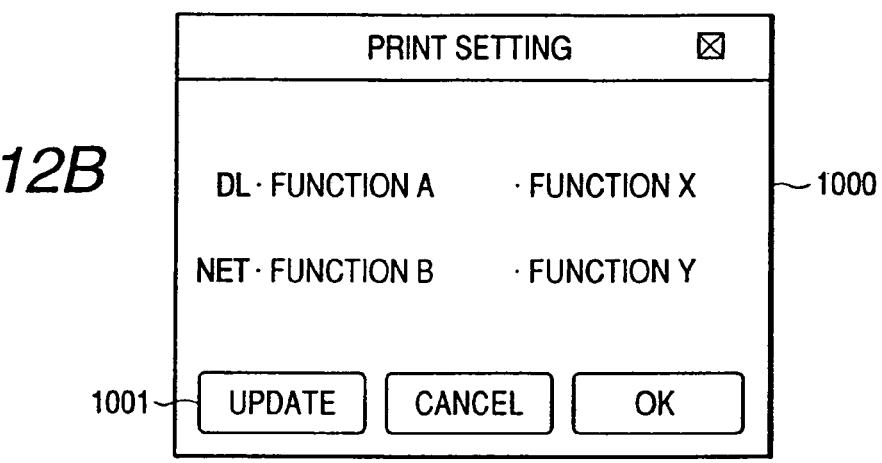
Figure 12C:
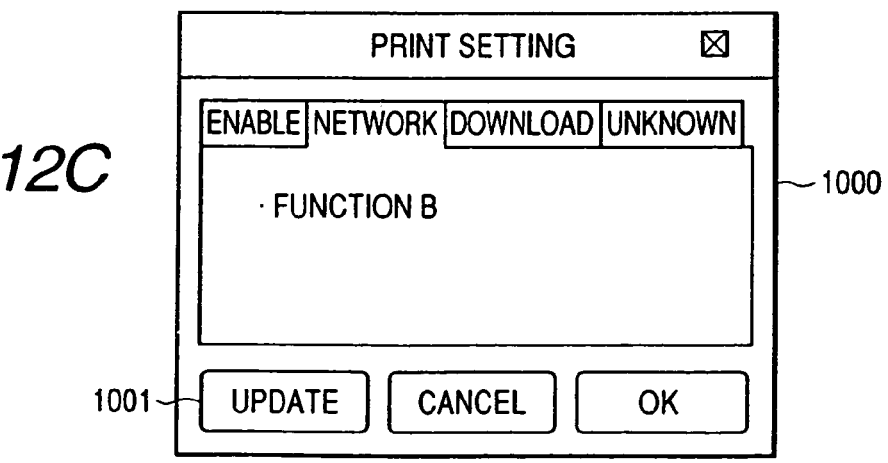

FIGS. 12A, 12B, and 12C are diagrams showing display examples of the print setting display screen after the "updating of function status" process was executed. That is, when the printer functions in the print control system are arranged as shown in the example of FIG. 9, when the update button 1001 in the print setting display screen 1000 shown in FIG. 10 is clicked by the user, the display state of each function in the print setting display screen 1000 changes as shown in the examples shown in FIGS. 12A, 12B, and 12C. The functions which have already been installed in the printer driver are expressed in a selectable active state (first display state).

In FIG. 12A, the name of the third printer function (function A) 431 which can be used by being downloaded into the client computer 10 is gray-out expressed in a second display state with an underline. The functions which cannot be downloaded (which are not supported) from the server computer 30 and the functions which cannot be executed in the optional construction of the present printer are gray-out displayed (third display state) as a conventional non-selecting state. The fourth printer function (function B) 432 in which the printer function installed in the server computer 30 can be used as it is regarded as a printer function which can be used soon. The name of such a printer function 432 is expressed in an ordinary color and expressed in the fourth display state with a shadow so as to be distinguished from other "valid" printer functions.

Naturally, the statuses of the printer functions can be expressed by a method whereby the color of characters showing the printer function or control is changed every status of the function, or the like. As a method other than the method shown in the example of FIG. 12A, the statuses of the functions can be also expressed in a variety of many methods.

FIG. 12B shows the example in the case where when the printer functions are in the statuses "download valid" and "network valid, " a dedicated icon is added before the name of the printer function and the status of the printer function is expressed.

Specifically speaking, with respect to the third printer function (function A) 431 in the status "download valid, " an icon "DL" is displayed before the name. With respect to the fourth printer function (function B) 432 in the status "network valid," an icon "Net" is displayed before the name.

FIG. 12C shows the example in which tabs of the statuses are provided and the functions having the attributes of the same display state are arranged in the same tab. In this example, the status of the printer function in the status "network valid" is expressed in a (Network) tab.

The method of expressing the status of the printer function is not limited to that mentioned above but a variety of many expressing methods other than the display examples shown in FIGS. 12A, 12B, and 12C are possible. For example, it is also possible to use a method whereby the information regarding the status of the printer function is disclosed in a tool chip (character message which is displayed when a mouse cursor is put in the position of the relevant function) for the relevant printer function and, when the user intends to use the relevant printer function, the information regarding the status of the printer function is displayed.

It is also possible to use a method whereby a button is arranged every status of the printer function and the information regarding the status of the printer function is displayed in another window which is called from the button.

Further, although the embodiment has been described with respect to the case of providing the function list (printer function information) 420 and the printer functions 431 to 433 from one specific server computer 30, as another method, the printer function information and the printer functions can be provided from a plurality of server computers 30.

In this case, by combining a method whereby the display for expressing the name of the printer function or the color or effect of the control is changed every server computer 30, or a method whereby the icon is changed every server computer 30 with the foregoing function expressing method, the location and status of the function can be visually recognized more easily. Particularly, it will be effective if those expressing methods are changed in accordance with the connecting state of the server computer 30, the LAN (Local Area Network), the Internet, or the like.

(With Respect to "Addition of Function")

Although an adding request of the printer function can be activated from anywhere such as printer driver, printer driver UI control module, or the like, it is activated when a function add button arranged in the print setting display screen is clicked, when the user intends to use the relevant printer function for the first time, or the like.

The control unit 320 of the client computer 10 issues the information such as IDs of the printer functions 431 to 433 to be required, corresponding printer model, and the like and an "obtainment of function" request to the obtaining unit 310.

After that, the process in the obtaining unit 310 (process in step S204 in FIG. 8) and the process in the management unit 410 of the server computer 30 (process in step S104 in FIG. 7) are executed. After completion of those processes, the display unit 330 is notified that the added printer functions 431 to 433 entered the "valid" status and a message showing the added printer functions 431 to 433 are in the "valid" status is displayed.

(With Respect to "Use of Server Function")

Although this process can be also activated from anywhere such as printer driver, printer driver UI control module, or the like in a manner similar to "addition of function," an actual data process is executed as a part of a command forming step.

The control unit 320 of the client computer 10 issues the information such as IDs of the required printer functions 431 to 433, the corresponding printer model, various set values necessary for the processes, object of the processing target, and the like and an "obtainment of function execution result" request to the obtaining unit 310. After that, the process in the obtaining unit 310 (process in step S205 in FIG. 8) and the process in the management unit 410 of the server computer 30 (process in step S105 in FIG. 7) are executed. The obtaining unit 310 returns execution results of those processes to the calling source side such as printer driver, printer driver UI control module, or the like.

In the embodiment as mentioned above, when the statuses of the printer functions 351, 352, and 431 to 433 which are realized by the print control system are displayed onto the print setting display screen 1000, the display state on the print setting display screen 1000 is dynamically changed on the basis of the printer function information disclosed on the function list 420 sent from the server computer 30 and the printer function information (internal function information) regarding (the substances of) the printer functions 351 and 352 which have already been installed in the client computer 10. Therefore, an intermediate status (status between "can be used" and "cannot be used" such as "if the function is downloaded from the server computer 30, it can be used, " "the function of the server computer 30 can be directly used, " or the like) can be displayed on the user interface of the client computer 10. The display states of those functions can be changed in an on-time manner as much as possible.

That is, according to the embodiment, by changing the display state on the print setting display screen 1000 in accordance with the status of the printer function, the user can easily and certainly recognize the status of the printer function which he wants to use upon printing. That is, among not only the items of the selectable function which have already been installed in the printer driver but also the items of the unselectable functions, the item of the function which can be used if a function additional module (plug-in) is downloaded from the server computer 30 and the item of the function which cannot be downloaded (which is not supported) are displayed so as to be distinguished. Therefore, since the user can recognize the fact that the function can be used if the function additional module is downloaded, it is possible to urge the user to expand the functions of the printer driver.

Second Embodiment

The second embodiment which is suitable for the invention will be described hereinbelow. The same component elements as those in the foregoing first embodiment are designated by the same reference numerals shown in FIGS. 1 to 12C and their detailed explanation is omitted here.

The first embodiment has been mentioned above with respect to the case where the function list request or the function obtaining request is issued by the client computer 10 to the server computer 30.

In the second embodiment, the function list 420 and the functions 431 to 433 are sent from the server computer 30 to the client computer 10.

To accomplish such a construction, the obtaining unit 310 of the client computer 10 side is in the constantly activating state or it is activated by the management unit 410 of the server computer 30.

The list of the client computers 10 as targets exists in the server computer 30. The server computer 30 side discriminates whether the function list 420 and the printer functions 431 to 433 are transmitted to the client computers 10 disclosed on this list or not.

It is necessary to transfer the function list 420 and the printer functions 431 to 433 to the client computers 10 just after the client computer 10 was introduced or when the printer function is newly added to the server computer 30.

The obtaining unit 310 of the client computer 10 receives those information each time the management unit 410 of the server computer 30 requests them. When the function list 420 is obtained, the obtaining unit 310 holds it therein. If "obtainment of function list" is requested by the control unit 320, the obtaining unit 310 responds to it by using the information of the function list 420 held in the obtaining unit.

When (the substances of) the printer functions 431 to 433 are obtained, a process equivalent to that in step S204 in FIG. 8 mentioned above is executed, a function related file group is stored into the memory area in the client computer 10, and thereafter, the printer function information in the function related file group is written once into the internal function information list 340.

According to the embodiment as mentioned above, the function list 420 and the printer functions 431 to 433 are sent from the server computer 30 to the client computer 10 just after the client computer 10 was introduced or when the printer function is newly added to the server computer 30. Therefore, in addition to the effects in the foregoing first embodiment, the client computer 10 can automatically obtain the function list 420 and the printer functions 431 to 433.

In other words, according to the embodiment, the user can specifically recognize the status of the printer function to be used without particularly becoming aware of it (without requesting the function list or requesting the obtainment of the function) as in the foregoing first embodiment.

Other Embodiments of the Invention

The invention also incorporates an embodiment in which program codes of software to realize the functions of the embodiments mentioned above are supplied to a computer in an apparatus or a system connected to the various devices so as to make the various devices operative in order to realize the functions of the embodiments mentioned above, and the various devices are made operative in accordance with a program stored in the computer (or a CPU or an MPU). of the system or the apparatus.

In this case, the program codes themselves of the software realize the functions of the embodiments mentioned above. The program codes themselves and means for supplying the program codes to a computer, for example, a recording medium in which the program codes have been stored construct the invention. As a recording medium for storing the program codes, for example, a flexible disk, a hard disk, an optical disk, a magnetooptic disk, a CD-ROM, a magnetic tape, a non-volatile memory card, a ROM, or the like can be used.

Naturally, the program codes are also incorporated in the embodiments of the invention in not only the case where the computer executes the supplied program codes, so that the functions of the embodiments mentioned above are realized but also the case where the functions of the embodiments mentioned above are realized by the program codes in cooperation with an OS (Operating System), other application software, or the like which is operating in the computer.

Further, naturally, the invention incorporates a case where supplied program codes are stored into a memory provided for a function expanding board of a computer or a function expanding unit connected to the computer, thereafter, a CPU or the like provided for the function expanding board or the function expanding unit executes a part or all of actual processes on the basis of instructions of the program codes, and the functions of the embodiments mentioned above are realized by those processes.

As described above, according to the invention, in the information processing apparatus as a client computer, the selectable function items which have already been installed in the printer driver and the items of the function which can be added by being obtained from the server are displayed so as to be distinguished, so that the statuses of the functions can be properly displayed. The user can easily and certainly recognize in what kind of status of the function which he wants to use upon printing is.

According to another invention, among not only the items of the selectable functions which have already been installed in the printer driver but also the items of the unselectable functions, the item of the function which can be used if the function additional module (plug-in) is downloaded from the server and the item of the function which cannot be downloaded (which is not supported) are displayed so as to be distinguished. Therefore, since the user can recognize the fact that the function can be used if the function additional module is downloaded, it is possible to urge the user to expand the functions of the printer driver.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus having a printer driver for instructing a printing apparatus to execute printing so that a function designated by a user is realized, comprising:
obtaining means for obtaining information on one or more functions which can be provided by a function providing apparatus from the function providing apparatus;
display control means for controlling a display of a status of the one or more functions which can be provided by the function providing apparatus onto a function setting display screen of the printer driver based on function information included in the information obtained by said obtaining means; and
downloading means for downloading function-related data for executing one of the one or more functions which can be provided by the function providing apparatus from the function providing apparatus,
wherein said display control means controls the display to display (a) a first function whose function-related data exists in said information processing apparatus and which is available by using the function-related data in said information processing apparatus, (b) a second function whose function-related data exists in the function providing apparatus and which will become available by downloading the function-related data by said downloading means into said information processing apparatus, and (c) a third function whose function-related data exists in the function providing apparatus and which will become available by using the function-related data from said function providing apparatus via a network, and
wherein the first, second and third functions are displayed distinguishably from each other.

2. An information processing apparatus according to claim 1, wherein said display control means controls the function setting display screen based on the function information included in the information obtained by said obtaining means such that the function which can be provided by the function providing apparatus, a function which has been available and a function which is unavailable may be displayed distinguishably from each other.

3. An information processing apparatus according to claim 1, wherein the information obtained by said obtaining means includes a list of functions which can be provided by the function providing apparatus and use conditions corresponding to the respective functions, wherein the use condition for each of the functions indicates either a condition in which the function becomes available by downloading to said information processing apparatus or a condition in which the function is unavailable in said information processing apparatus, and wherein said display control means controls the function setting display screen based on the use conditions and function information which has been provided such that display status for the functions may be changed.

4. A method for an information processing apparatus having a printer driver for instructing a printing apparatus to execute printing so that a function designated by a user is realized, comprising:
an obtaining step of obtaining information on one or more functions which can be provided by a function providing apparatus from the function providing apparatus;
a display control step for controlling a display of a status of the one or more functions which can be provided by the function providing apparatus onto a function setting display screen of the printer driver based on function information included in the information obtained by said obtaining step; and a downloading step of downloading function-related data for executing one of the one or more functions which can be provided by the function providing apparatus from the function providing apparatus, wherein said display control step controls the display to display (a) a first function whose function-related data exists in said information processing apparatus and which is available by using the function-related data in said information processing apparatus, (b) a second function whose function-related data exists in the function providing apparatus and which will become available by downloading the function-related data by said downloading step into said information processing apparatus, and (c) a third function whose function-related data exists in the function providing apparatus and which will become available by using the function-related data from said function providing apparatus via a network, and wherein the first, second and third functions are displayed distinguishably from each other.

5. A method according to claim 4, wherein said display control step controls the function setting display screen based on the function information included in the information obtained by said obtaining step such that the function which can be provided by the function providing apparatus, a function which has been available and a function which is unavailable may be displayed distinguishably from each other.

6. A method according to claim 4, wherein the information obtained by said obtaining step includes a list of functions which can be provided by the function providing apparatus and use conditions corresponding to the respective functions, wherein the use condition for each of the functions indicates either a condition in which the function becomes available by downloading to said information processing apparatus or a condition in which the function is unavailable in said information processing apparatus, and wherein said display control step controls the function setting display screen based on the use conditions and function information which has been provided such that display status for the functions may be changed.

7. A computer readable storage medium on which is stored a computer executable program for executing a method for an information processing apparatus having a printer driver for instructing a printing apparatus to execute printing so that a function designated by a user is realized, comprising:

an obtaining step of obtaining information on one or more functions which can be provided by a function providing apparatus from the function providing apparatus;

a display control step of controlling a display of a status of the one or more functions which can be provided by the function providing apparatus onto a function setting display screen of the printer driver based on function information included in the information obtained by said obtaining step; and a downloading step of downloading function-related data for executing one of the one or more functions which can be provided by the function providing apparatus from the function providing apparatus, wherein said display control step controls the display to display (a) a first function whose function-related data exists in said information processing apparatus and which is available by using the function-related data in said information processing apparatus, (b) a second function whose function-related data exists in the function providing apparatus and which will become available by downloading the function-related data by said downloading step into said information processing apparatus, and (c) a third function whose function-related data exists in the function providing apparatus and which will become available by using the function-related data from said function providing apparatus via a network, and wherein the first, second and third functions are displayed distinguishably from each other.

8. A computer readable storage medium according to claim 7, wherein said display control step controls the function setting display screen based on the function information included in the information obtained by said obtaining step such that the function which can be provided by the function providing apparatus, a function which has been available and a function which is unavailable may be displayed distinguishably from each other.

9. A computer readable storage medium according to claim 7, wherein the information obtained by said obtaining step includes a list of functions which can be provided by the function providing apparatus and use conditions corresponding to the respective functions, wherein the use condition for each of the functions indicates either a condition in which the function becomes available by downloading to said information processing apparatus or a condition in which the function is unavailable in said information processing apparatus, and wherein said display control step controls the function setting display screen based on the use conditions and function information which has been provided such that display status for the functions may be changed.

* * * * *